United States Patent [19]
Collings et al.

[11] Patent Number: 6,054,823
[45] Date of Patent: Apr. 25, 2000

[54] VERIFICATION OF FAN OPERATION

[75] Inventors: Jerry Collings, Santa Clara; Chuong Nguyen, San Jose, both of Calif.; Joseph James Judkins, III, Cedar Park; Donald E. Alfano, Round Rock, both of Tex.; Ali Tasdighi; Quoi V. Huynh, both of San Jose, Calif.; Sang T. Ngo, Cupertino, Calif.

[73] Assignee: Telcom Semiconductor, Inc., Mountain View, Calif.

[21] Appl. No.: 09/081,309

[22] Filed: May 19, 1998

[51] Int. Cl.$^7$ ..................................................... H01R 39/46
[52] U.S. Cl. ........................... 318/439; 318/138; 318/254; 318/600; 318/800
[58] Field of Search ................................... 318/439, 138, 318/254, 800, 600

[56] References Cited

U.S. PATENT DOCUMENTS

| | | | |
|---|---|---|---|
| 4,097,789 | 6/1978 | Doemen | 318/461 |
| 4,459,519 | 7/1984 | Erdman | 318/254 |
| 4,479,115 | 10/1984 | Holzhauer | 340/611 |
| 4,513,233 | 4/1985 | Giammarrusco | 318/565 |
| 5,606,232 | 2/1997 | Harlan et al. | 318/138 |
| 5,727,928 | 3/1998 | Brown | 417/44.11 |

OTHER PUBLICATIONS

U.S. Patent Application Ser. No. 08/749,864, entitled "Monolithic Fan Controller," by inventors Quoi V. Huynh et al., filed Nov. 14, 1996, 24 pages (copy not provided per M.P.E.P. § 609).

"Integrated Fan/Motor Driver," TelCom Semiconductor, Inc. datasheets, Sep. 29, 1997, 7 pages (download from http://www.telcom–semi–com/datashts/TC643.pdf on May 15, 1998).

*Primary Examiner*—Karen Masih
*Attorney, Agent, or Firm*—Thomas E. Schatzel; Law Offices of Thomas E. Schatzel, A Prof. Corp.

[57] ABSTRACT

An apparatus for sensing the rotation of a brushless DC fan includes the fan and a sense/driver circuit and a capacitance. The sense/driver circuit is coupled to the fan to receive a sense input signal including a fluctuating electrical effect caused by fan commutation events. The sense/driver circuit processes the sense input signal to generate a sense output signal indicative of fan operation. The sense/driver circuit includes an integrated circuit. The integrated circuit includes a sense input pin, a ground return pin, a driver circuit, an integrated filter portion, a filter pin and a level detecting circuit. The capacitance is coupled to the filter pin to provide a filter with the integrated filter portion. The driver circuit includes a control terminal, a first current handling terminal coupled to the sense input pin and a second current handling terminal coupled to provide a ground return pat. The integrated filter portion includes a filter input coupled to at least one of the first and second current handling terminals of the driver circuit, and a filter output for providing a filter output signal to the level detecting circuit. The level detecting circuit generates the sense output signal from the filter output signal. The filter derives the filter output signal indicative of the fan commutation events responsive to receiving a signal at the sense input pin.

27 Claims, 7 Drawing Sheets

VERIFICATION OF FAN OPERATION

BACKGROUND

1. Field of the Invention

The present invention relates fan operation verification and speed measurement techniques, and, more particularly, to methods and apparatus for sensing the rotation and/or speed of a brushless DC fan motor.

2. Description of the Related Art

Fans are standard components in many commercial computers, workstations, notebook and desktop personal computer systems, and in many other electronic and mechanical systems. Fans remove heat generated due to operation of integrated circuits and other components in such systems. An example of a common type of fan is the brushless DC fan. Brushless fans do not include a conductor serving to maintain an electrical connection between stationary and moving parts of the fan. Brushless DC fans have become standard components in many computer systems.

Inadequate cooling due to a fan failure in a system including electronic components may subject the system to a thermal runaway condition resulting in failure of one or more of the electronic components. Component failure often results in expensive repair or replacement of the components or of the entire system. Proper fan operation is therefore critical to the continued operation of such systems, and great importance is placed on early detection of impending fan failures.

The most common causes of fan failure are mechanical in nature. For example, abnormal motor bearings can cause a fan to run at a less than rated speed which in turn can increase the temperature within the system enclosure. Other causes of fan failure include open or shorted fan motors (e.g., no fan rotation due to an open or short circuit in the motor power supply lines, power connector or in the fan itself).

Fan failures of these and other types can be detected by comparing actual fan speed to other system parameters such as a measured system temperature and a fan speed control signal. If the measured fan speed is inconsistent with these parameters, abnormal fan operation is indicated. Many computer systems include fan fault detection techniques. One common fan fault detection technique uses a sensor located adjacent to the fan to monitor air flow. Another common fan fault detection scheme uses a custom fan assembly having a built-in rotational sensor that produces an output waveform proportional to fan speed.

However, the above mentioned fan fault detection techniques often require a custom-made fan which is typically more expensive and less commercially available than standard fans which are used in most personal computer systems. Also, the use of custom fans causes problems with component interchangeability. For example, although a typical fan that is mounted in a personal computer system receives direct current (DC) power from a two terminal interface connector located within the personal computer system, a custom fan assembly often requires a non-standard three terminal electrical connector.

A sensor for monitoring air flow includes additional disadvantages in that an air flow sensor must be mounted in a proper location with respect to the fan to properly sense the air flow, thereby complicating the mechanical layout and assembly of the system, increasing assembly cost and possibly compromising system reliability. Also, air flow sensors are often expensive.

SUMMARY

It has been discovered that the rotational movement and speed of a brushless DC fan motor may be detected by monitoring fan current for fluctuations which occur at each motor pole crossing and by accounting for a resulting number of detected fluctuations per time interval in relation to the number of poles contained in the fan motor. Such a fan speed measurement technique provides the advantage that rotational fan speed and/or movement may quickly and inexpensively be detected without requiring an expensive and/or custom fan. The technique provides an output representative of the rotational fan speed times the number of poles in the fan motor. In each case, a standard 2 wire interconnect may be used, thereby allowing use with most or all DC brushless fans. Furthermore, a low pass filter may be used in conjunction with a comparator in a detection circuit for detecting the rotational movement of a fan motor. Such a configuration provides the advantage that all elements of the detection circuit that are separate from a standard fan motor circuit may be comprised within an integrated circuit except for a capacitor. Thus, the detection circuit is easily implemented with a minimized die area in a wide variety of semiconductor processes and requires one external component attached at one package pin. Further advantages include no requirement of a reference voltage as an input for comparison and high rejection of noise at both power supply and ground reference potentials.

In one embodiment, an apparatus for serving the rotation of a brushless DC fan includes the fan and a sense/driver circuit aid a capacitance. The sense/driver circuit is coupled to the fan to receive a sense input signal. The sense input signal includes a fluctuating electrical effect caused by fan commutation events. The sense/driver circuit processes the sense input signal to generate a sense output signal from the electrical effect. The sense output signal is indicative of fan operation. The sense/driver circuit includes an integrated circuit. The integrated circuit includes a sense input pin, a ground return pin, an integrated filter portion, a filter pin, and a level detecting circuit. The sense input pin is coupled to receive the sense input signal. The ground return pin is coupled to a ground reference potential. The driver circuit opens and closes a circuit to connect and disconnect power to the fan. The driver circuit includes a control terminal and first and second current handling terminals. The first current handling terminal is coupled to the sense input pin. The second current handling terminal is coupled to provide a ground return path via the ground return pin. The integrated filter portion includes a filter input coupled to at least one of the first and second current handling terminals of the driver circuit. The integrated filter portion includes a filter output for providing a filter output signal. The filter pin is coupled to the integrated filter portion. The level detecting circuit has an input coupled to receive the filter output signal. The level detecting circuit generates the sense output signal from the filter output signal. The capacitance is coupled to the filter pin. The integrated filter portion and the capacitance provide a filter. The filter derives the filter output signal responsive to receiving a signal at the sense input pin. The filter output signal is indicative of the fan commutation events.

In another embodiment, an apparatus for sensing the rotation of a brushless DC fan includes a sense circuit. The sense circuit is coupled to receive a sense input signal. The sense input signal includes a fluctuating electrical effect caused by fan commutation events. The sense circuit processes the sense input signal to generate a sense output signal from the electrical effect. The sense output signal is indicative of fan operation. The sense circuit includes an integrated circuit The integrated circuit includes a sense input pin, an integrated filter portion, a filter pin and a level detecting circuit. The sense input pin is coupled to receive the sense input signal. The integrated filter portion is coupled to the sense input pin. The integrated filter portion has a filter output for providing a filter output signal. The filter pin is coupled to the integrated filter portion. The level detecting circuit has an input coupled to receive the filter output signal. The level detecting circuit generates the sense output signal from the filter output signal. The filter pin of tie integrated circuit is for coupling to a discrete capacitor. The integrated filter portion and the capacitance provide a filter when the capacitor is coupled to the filter pin. The filter derives the filter output signal responsive to receiving a signal at the sense input pin. The filter output signal is indicative of the fan commutation events.

In another embodiment, a method of verifying the operation of a brushless DC fan includes providing an integrated circuit and providing an integrated filter portion, a level detecting circuit and a driver circuit on the integrated circuit. The integrated circuit has a filter pin and a sense input pin. The sense input pin is coupled to receive a fluctuating electrical effect caused by fan commutation events. The integrated filter portion includes a resistance. The resistance includes a first terminal coupled to a filter input and a second node coupled to the filter pin and a filter output. The level detecting circuit has an input coupled to the filter output. The driver circuit has first and second current handling terminals. The first current handling terminal is coupled to the sense input pin. The second current handling terminal is coupled to provide a ground return path. At least one of the first and second current handling terminals is coupled to the filter input.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to be illustrative of the invention and should not be taken to be limiting. Rather, any number of variations may fall within the scope of the invention which is defined in the claims following the description.

In a fan unit including a DC brushless fan having a plurality of motor poles, the current applied to the fan is monitored for fluctuations which occur at each motor pole crossing of the fan. The supply current to the fan includes the higher frequency fluctuations along with lower frequency components due to other factors. In one embodiment, the higher frequency components are sampled from the supply current using a low pass filter and a comparator, the majority of components of which are integrated onto a monolithic integrated circuit. The use of the low pass filter allows integration of the sensing circuit and output drive transistor with minimum off-chip discrete components, and minimum chip die area. For example, in the embodiment described below, the sensing circuit and output drive transistor are fully integrated, except for the inexpensive capacitor associated with the low pass filter. The capacitor, is coupled to the integrated circuit via one pin connection. The required value of this capacitor would add significant die area if integrated on-chip. By moving this capacitor off-chip, die area is saved at the expense of only one pin. The comparator detects and amplifies the higher frequency fluctuations associated with the commutation pulses of the fan motor.

Fan operation is verified by checking for the fluctuations in the output of the sensing circuit. Fan speed may be determined by dividing the resulting number of these fluctuations by the time interval over which the fluctuations occurred and by the number of poles of the fan motor. The aforementioned calculations are easily performed with an inexpensive microcontroller or arithmetic logic module. Such an arithmetic logic module may be an arithmetic logic circuit, unit and/or software module.

Figure 1:
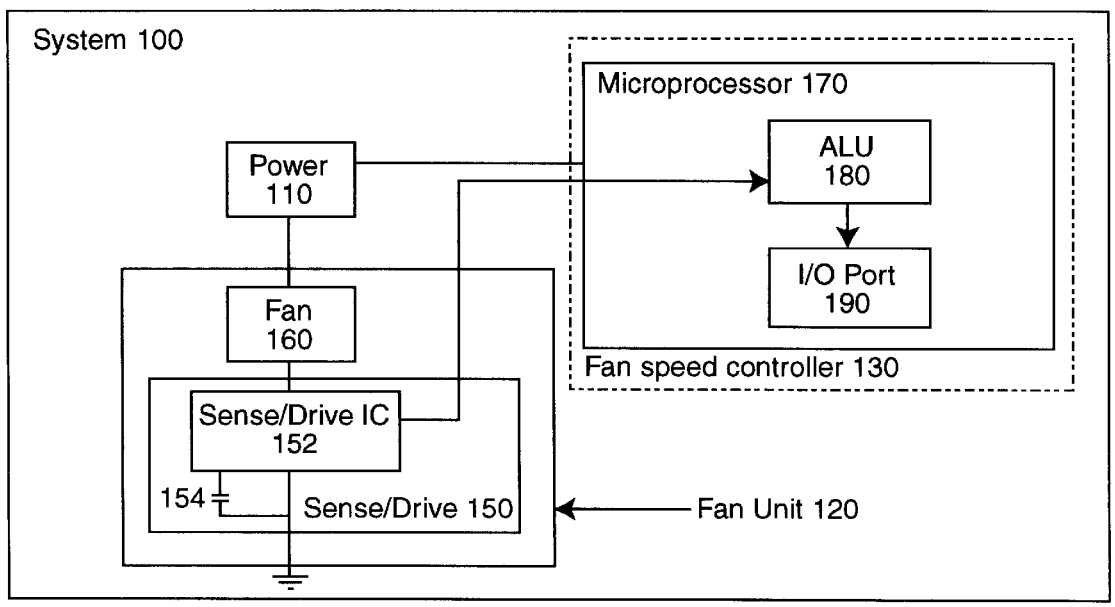
FIG. 1 shows a block diagram of one embodiment of a system in accordance with the invention.

FIG. 1 shows a system 100 in accordance with the invention. System 100 includes power supply 110, fan unit 120 and fan controller 130. Fan unit 120 includes a series circuit including a power node coupled to power supply 110, brushless DC fan motor and fan 160 (hereinafter, fan 160), sense/drive circuit 150 and a ground node coupled to ground. Sense/drive circuit 150 includes sense/drive integrated circuit (IC) 152 and capacitor 154. Fan controller 130 includes an information processing circuit such as microprocessor 170 for controlling the operation of fan 160. Microprocessor 170 includes arithmetic logic module 180 (e.g., an arithmetic logic unit or ALU) and I/O port 190.

Power supply 110 is coupled to provide power to fan unit 120 and microprocessor 170. Sense/drive IC 152 is coupled to capacitor 154 and to ALU 180 to provide a sense output signal to ALU 180. ALU 180 is coupled to provide to fan controller 130 via I/O port 190 information and/or control regarding the operation and/or speed of fan 160 as sensed by sense/drive circuit 150 and processed by ALU 180.

In operation, fan unit 120 cools heat generating components (e.g., microprocessor 170 and power supply 110) of system 100. Power supply 100 supplies power to fan unit 120 and to microprocessor 170. Microprocessor 170 controls the operation of fan 160 by controlling the application of power to fan 160 through sense/drive circuit 150. Sense/drive circuit 150 verifies the operation of fan 160 and provides an indication of the fan's operation (e.g., a pulse train the frequency of which is proportional to fan speed) to ALU 180 of microprocessor 170. Specifically, sense/drive circuit 150 senses an electrical effect (e.g., current or voltage) in fan unit 120 which is representative of the operation and/or speed of fan 160 and is used to generate a fan verification/speed signal which is provided to ALU 180. ALU 180 provides control signals to fan controller 130 via I/O port 190 to control the application of power to fan 160 to control the operation/speed of fan 160.

Figure 2:
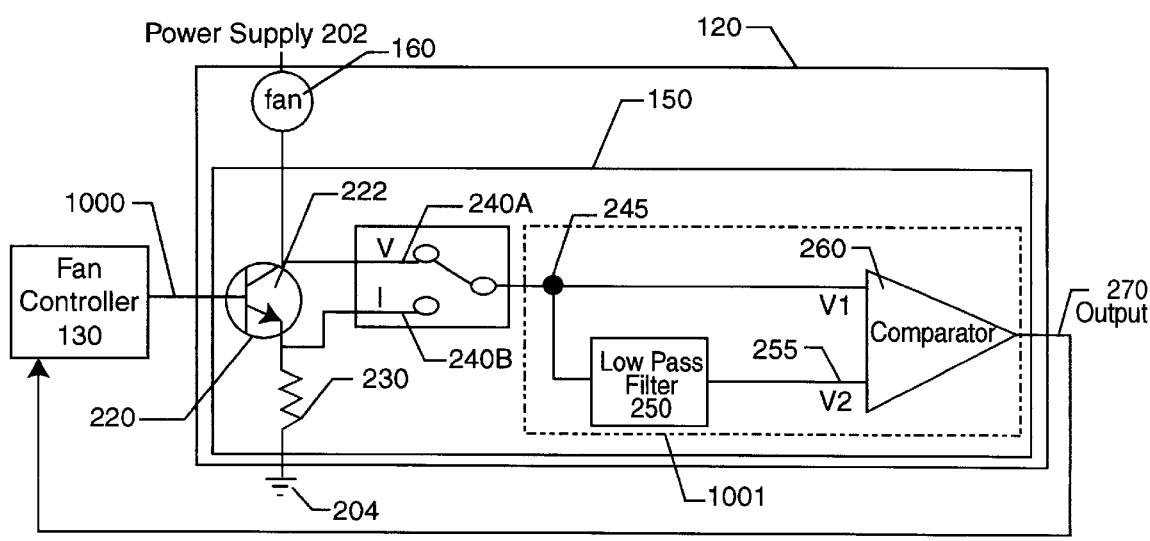
FIG. 2 shows a circuit diagram of one embodiment of a fan unit coupled to a fan controller in accordance with the invention.

FIG. 2 shows fan unit 120 and fan controller 130 in accordance with the invention. Fan unit 120 includes sense/drive circuit 150 and fan 160. Sense/drive circuit 150 includes switch circuit 220, current sensing resistor 230 and sense circuit 1001. Switch circuit 220 includes NPN transistor 222 integrated on-board the sense/drive IC 152. Current sensing resistor 230 allows the sensing of current through fan 160 by sense/drive IC 152. DC blocking condenser includes filter 250 and comparator 260. Fan controller 130 may include microprocessor 170, or any combination of discrete circuits that provide the same function as microprocessor 170. Specifically, an arithmetic logic unit (ALU) to measure fan speed and to provide a fan control signal to sense/drive circuit 150. Fan control signal 1000 may be pulse width modulated (PWM), pulse frequency modulated (PFM), or a simple fan ON/OFF control signal. Fan controller 130 drives the motor of brushless DC fan 160 through driver transistor 222.

Power node 202 is a positive potential power node. Power node 204 is a ground potential power node and is referred to hereinafter as ground 204. Fan 160 has a first node coupled to power node 202 and a second node coupled to a first node of switch circuit 220 (e.g., collector node 240A). Resistance 230 has a first node coupled to a second node of switch circuit 220 (e.g. emitter node 240B), and a second node coupled to ground 204. A third node of switch circuit 220 (e.g., base node 1000) is coupled to receive a control signal from fan controller 130.

Sense circuit 1001 is a DC blocking condenser including sense input 245, low pass filter 250, comparator 260 and output 270. Sense input 245 is coupled to a node of the series circuit including fan 160 and switching circuit 220. Sense input 245 may be coupled to any node appropriate for sensing an electrical effect that is representative of the operation of fan 160. Filter 250 is a low pass filter having a filter input coupled to sense input 245 and a filter out put coupled to comparator 260 at comparator input 255. Comparator 260 includes a first comparator input coupled to sense input 245, a second comparator input 255 coupled to the filter output of filter 250, and a comparator output at sense output 270.

Sense circuit 1001 is coupled to the series circuit including fan 160 and switching circuit 220 at a node 240 to sense an electrical effect in series circuit 140. The electrical effect is representative of the speed and/or operation of fan 160 and is used to generate the fan verification/speed signal at sense output 270. Sense circuit 1001 may be coupled to the series circuit at any appropriate node to sense the electrical effect. For example, in the embodiment of FIG. 2, sense input 245 of sense circuit 1001 is coupled to the series circuit at collector node 240A, but may alternatively be coupled to the series circuit at emitter node 240B.

In operation, fan controller 130 provides a control signal to transistor 222 to control the application of power to fan 160 (e.g., by controlling the current through fan 160). When the control signal has a first value (e.g., logic high) transistor 222 is conducting, the series circuit 140 including fan 16 and switching circuit 220 is closed, and full power is applied to fan 160. When the control signal has a second value (e.g., logic low) transistor 222 is not conducting, the series circuit is open, and no power is applied to fan 160. The control signal 1001 provided by fan controller 130 is a pulse width modulated or pulse frequency modulated signal or a logic on/off signal which controls the average amount of time that transistor 222 is conducting and thus the average amount of power applied to fan 160.

The current through fan 160 is momentarily interrupted whenever the internal electronics of fan 160 sequence the power supplied to the next electromagnetic pole, thereby causing a commutation interruption or fluctuation in the current flowing through fan unit 120. The number of poles of fan 160 equals the number of such commutation fluctuations per fan revolution. For example, for a four pole fan, there are four commutation current fluctuations per revolution The above described commutation current fluctuations can be detected by monitoring the voltage at collector node 240A of the output drive transistor 222 or by using a current sampling resistor 230 and measuring the voltage at emitter node 240B.

Figure 3:
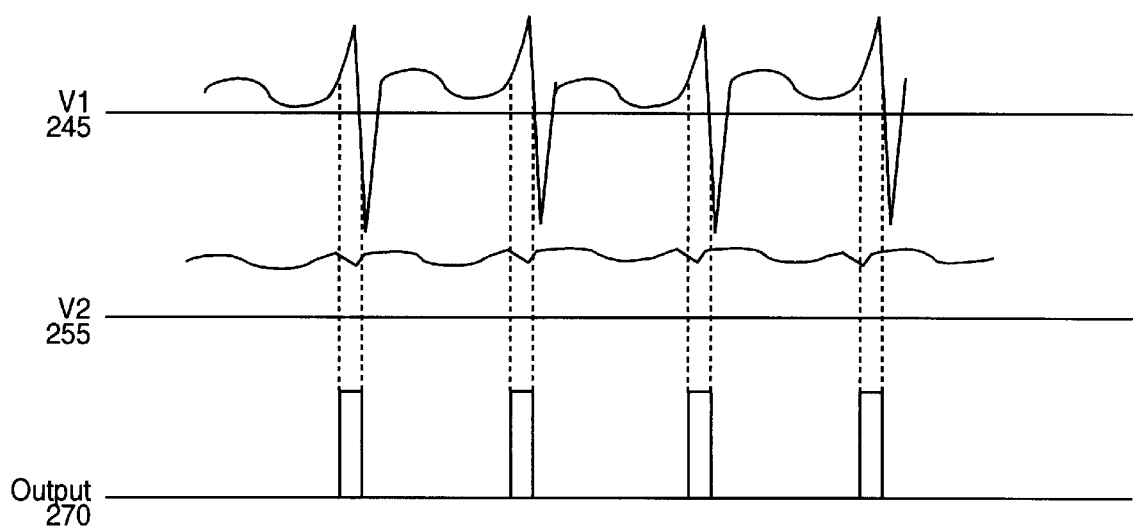
FIG. 3 shows a timing diagram of typical operating waveforms of signals of FIG. 2.

The fan current or voltage waveform at sense input 245 is applied to the inputs of both the low pass filter 250 and the comparator 260. Referring to FIG. 3, the waveform V1 at sense input 245 (from either of nodes 240A, 240B) contains both high frequency components (e.g., desired signal information caused by the motor pole crossings) and low frequency components (e.g., unwanted signal information related to motor rotational energy). Referring to FIGS. 2 and 3, the unfiltered signal V1 at sense input 245 applied to comparator 260 contains both the low frequency components and the high frequency components. Tie low pass filter 250 attenuates the higher frequency components contained in the input waveform V1 and passes the lower frequency, rotational energy components of the input waveform to provide waveform V2 at filter output/comparator input node 255.

Comparator 260 compares the filtered signal V2 at node 255 and the unfiltered signal V1 at sense input 245, and amplifies the result by the gain of comparator 260. The circuit action of comparator 260 may be mathematically described as follows:

$$V_{OUT} = G \times [(HF+LF) - LF];$$

from which $$V_{OUT} = G \times HF$$

where $V_{OUT}$ is the voltage at sense output 270, G is the gain of comparator 260, HF indicates the high frequency components (e.g., the pole crossing informational components), and LF indicates the low frequency components (e.g., the rotational energy informational components). Comparator 260 effectively subtracts the filtered signal V2 at node 255 and the unfiltered signal V1 at node 245, and multiplies the result by a constant equal to the gain of the comparator. Referring to FIG. 3, the resulting sense output 270 signal is an electronic pulse which occurs coincident with each fan motor pole crossing.

Figure 4:
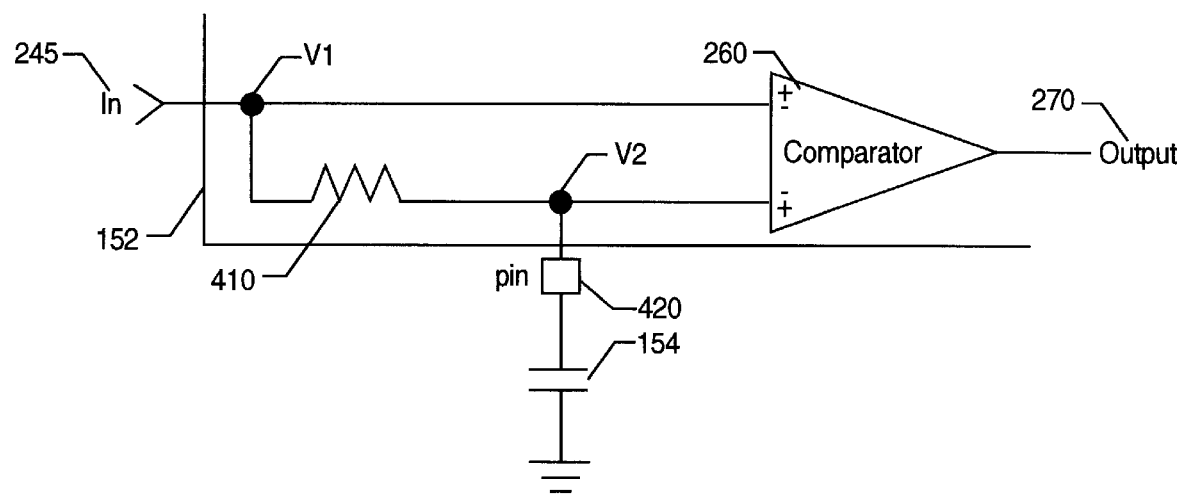
FIG. 4 shows a circuit diagram of one embodiment of a sense circuit in accordance with the invention.

Referring to FIG. 4, sense/drive circuit 150 includes integrated circuit 152 and capacitor 154. Integrated circuit 152 includes sense input 245, resistor 410, pin 420, comparator 260 and sense output 270. Capacitor 154 is coupled to integrated circuit 152 via pin 420. Filter 250 includes capacitor 154 and resistor 410 coupled together in a low pass filter configuration. Sense input 245 may or may not be coupled to a pin of sense/drive IC 152 depending upon whether fan controller 130 is integrated onto sense/drive IC 152 and depending upon where sense input 245 is coupled to series circuit 140. Integrated circuit 152 may include fan controller 130 and resistance 230.

The cutoff frequency of the low pass filter 250 is typically on the order of hundreds of Hertz to provide for fans 160 mace by different vendors. A cutoff frequency having a value in such a low range causes capacitor 154 to be too large for practical implementation in a monolithic silicon integrated circuit. The addition of pin 420 allows the use of an inexpensive, external capacitor 154. Since one terminal of the two-terminal capacitor 154 is connected to ground 204, only one integrated circuit package pin is required for attachment of capacitor 154. Consequently, the size of the integrated circuit package is reduced, and/or additional pins are allowed for implementation of other product features.

Figure 5A:
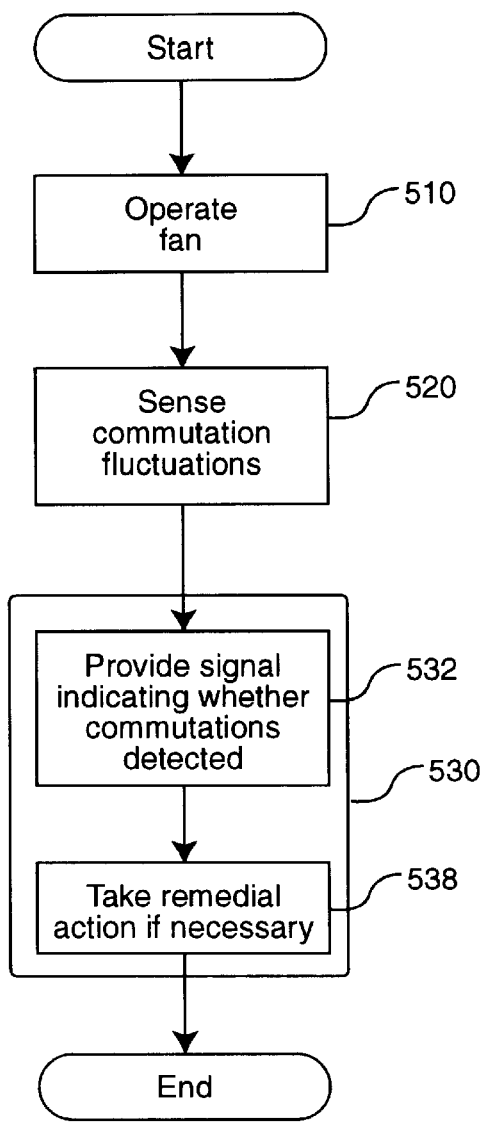
FIGS. 5A–5B show flow charts of various embodiments of a method in accordance with the invention.
Figure 5B:
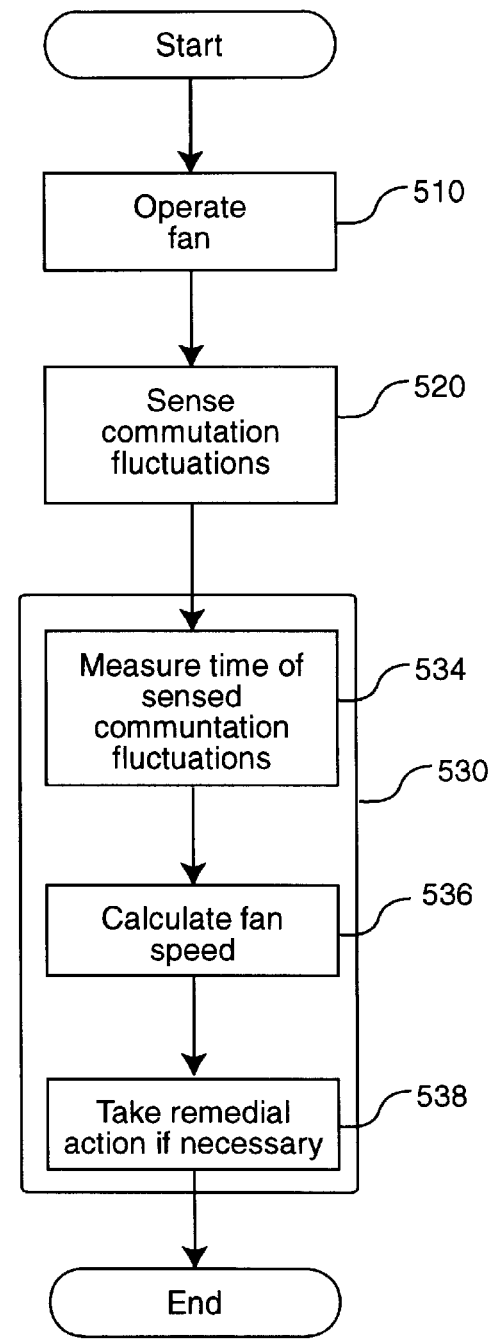

Referring to FIGS. 5A and 5B, fan 160 is operated during operation 510. After operation 510, commutation events of the rotating fan 160 are detected using the above described circuitry during sense operation 520. After sense operation 520, information regarding the commutation events are processed during process operation 530. Referring to the embodiment of FIG. 5A, sense signal 270 is provided during provide operation 532 to indicate whether commutations have been detected, thereby indicating whether fan 160 is operational. If sense signal 270 indicates that there are no commutation events and that fan 160 is not operational, remedial action such as shutting down the system may be required during operation 538. Other factors such as system temperature may factor in to a determination of whether remedial action is required during operation 538. Referring to FIG. 5B, sense signal 270 indicates operation and speed of fan 160. That is, sense signal 270 includes a pulse for each commutation event over a period of time which is measured during measure operation 534. After measure operation 534 and during calculation operation 536, the speed of fan 160 may be calculated (e.g., by ALU 180) from the time measured during operation 534, the number of commutation events indicated by the pulses of sense signal 207 and the number of poles of fan 160. If the speed of the fan is insufficient given other system factors (e.g., system temperature), then remedial action such as increasing the speed of fan 160 by fan controller 130 or shutting down system 100 may be required during operation 538.

Figure 6A:
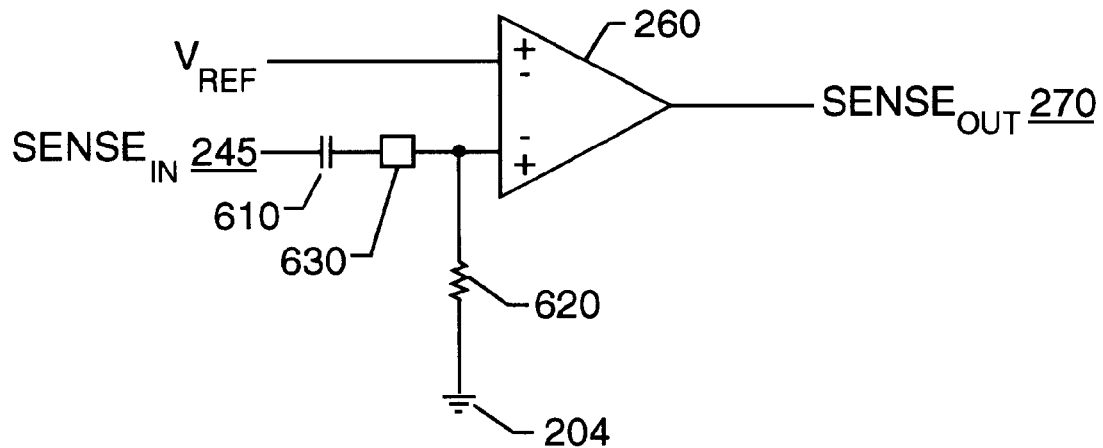
FIGS. 6A–6E show circuit diagrams of various embodiments of a sense circuit in accordance with the invention.
Figure 6B:
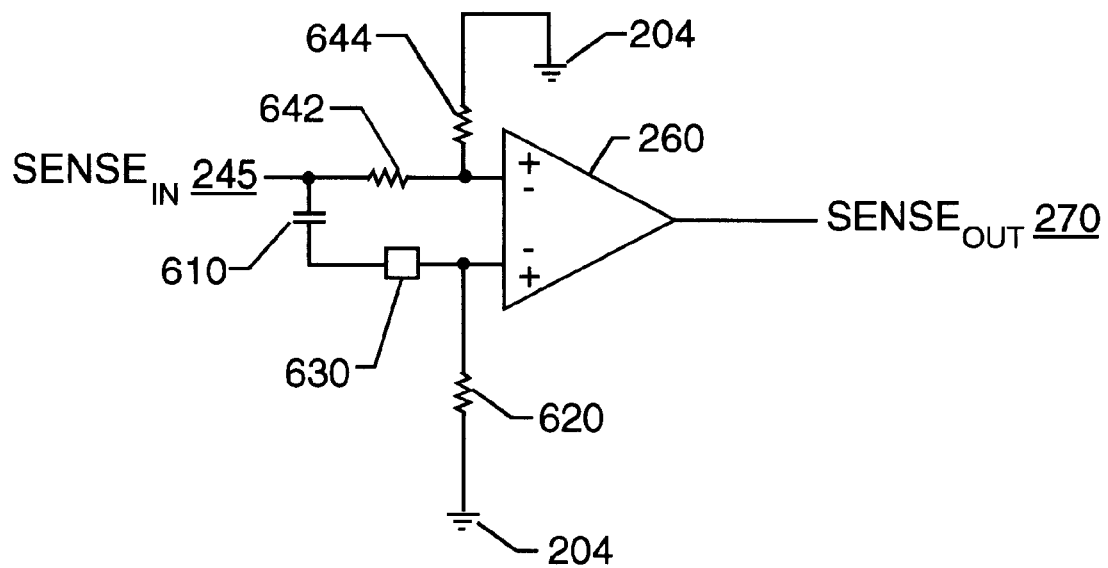

FIGS. 6A and 6B show alternative embodiments of sense circuit 1001. In each case, an input denoted "SENSE$_{IN}$" refers to a voltage or current input from collector node 240A, emitter node 240B or other appropriate node of a circuit including fan 160.

Referring to FIG. 6A, sense circuit 1001 includes comparator 260, capacitor 610 and resistance 620. Capacitor 610 is coupled to resistance 620 in a high pass filter configuration via pin 630. Comparator 260 compares reference voltage $V_{REF}$ and a high pass filtered sense input 245 to generate sense output 270. Thus, the high frequency components of the current of fan 160 are passed to comparator 260, which asserts a pulse during each fluctuation above or below $V_{REF}$ depending on how the inverting and non inverting inputs of comparator 260 are coupled to $V_{REF}$ and the high pass filter.

Referring to FIG. 6B, sense circuit 1001 includes comparator 260, capacitor 610, resistance 620, and a voltage divider including resistances 642, 644. Capacitor 610 is coupled to resistance 620 in a high pass filler configuration via pin 630. Comparator 260 compares a biased sense input 245 and a high pass filtered sense input 245 to generate sense output 270. The embodiment of FIG. 6B is useful if there is a low or no DC component to sense input 245.

Figure 6C:
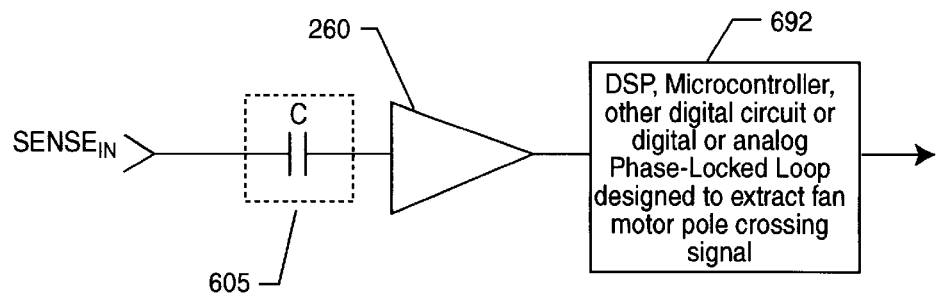

Referring to FIG. 6C, sense circuit 1001 includes coupling 605, amplifier or comparator 260, and processing circuit 692. Coupling 605 may be a DC or capacitive coupling. Amplifier 260 may be a single-ended or differential amplifier. Processing circuit 692 may be a digital signal processor (DSP), a microcontroller, or other digital circuit. Processing circuit 692 may be a digital or analog phase-locked loop (PLL) for extracting a fan motor pole crossing signal.

Figure 6D:
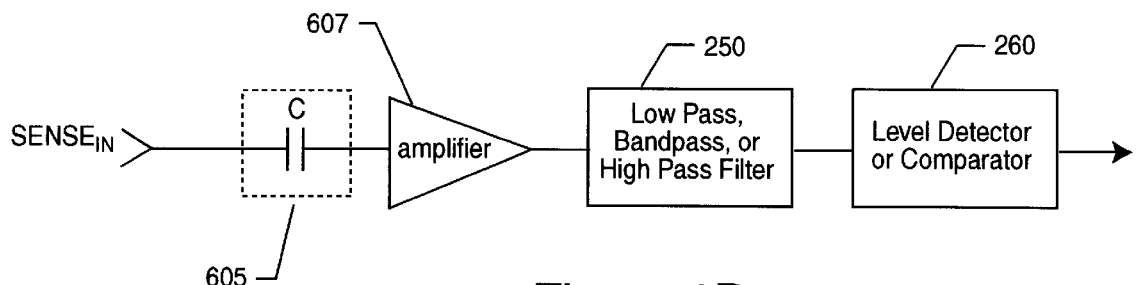

Referring to FIG. 6D, sense circuit 100 includes coupling 605, amplifier 607, filter 250 and level detector or comparator 260. Amplifier 607 amplifies AC component of sense input 245 if coupling 605 is capacitive. Amplifier 607 may be a single-ended or differential amplifier.

Figure 6E:
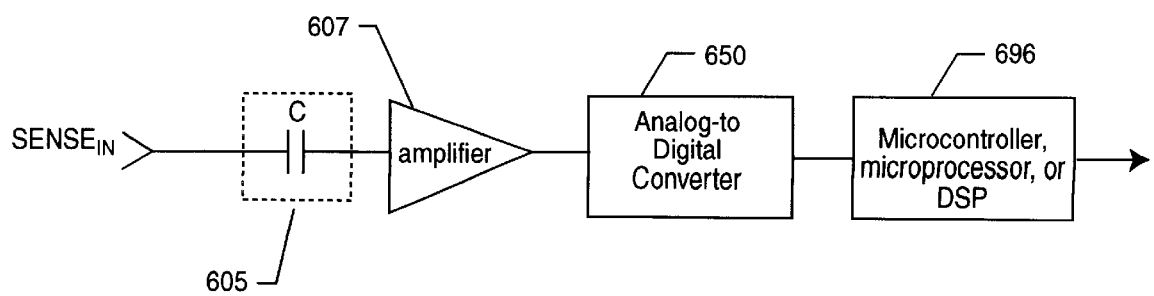

Referring to FIG. 6E, sense circuit 1001 includes coupling 605, amplifier 607, analog-to-digital converter (ADC) 650 and processing circuit 696. Processing circuit 696 may be a digital signal processor (DSP), a microcontroller, or microprocessor, for example. Analog-to-digital converter 650 quantizes and digitizes the fan waveform and provides the resulting data signal to processing circuit 696. Processing circuit 696 operates on this data signal in real time using a dedicated software algorithm to calculate fan speed.

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

For example, in one embodiment, fan unit 120 is a stand-alone circuit including sense/drive circuit 150 for detecting and/or verifying operation of fan 160. In another embodiment, fan unit 120 is a part of a larger system 100 to provide an substantially integrated fan speed detector, driver and/or controller. Sense/drive circuit 150 is especially well-suited to implementation as a monolithic integrated circuit in that only one external component (e.g., an inexpensive capacitor 154) of sense/drive circuit 150 is required and which connects to sense/drive IC 152 using only one package pin.

In the embodiment of FIG. 1, fan controller 130 is shown as being logically separate from sense/drive IC 152. In one embodiment, fan controller 130 is integrated with sense/drive IC 152 to provide a control and sense integrated circuit. In one embodiment, the sense and control functions are integrated into a TelCom TC646 pulse-width modulated (PWM) thermal fan speed control integrated circuit manufactured by TelCom Semiconductor, Incorporated (referred to hereinafter as TelCom), of Mountainview, Calif. A data sheet for the TC646 is publicly available from TelCom and via the internet at TelCom's web site. The data sheet for the TC646 part which is available, for example, at internet uniform resource locator address http://www.telcom-semi.com/datashts/TC646.pdf on Apr. 20, 1998 is incorporated herein by reference. Thus, in at least one embodiment, fan controller 120 includes a fan control circuit. In other embodiments, fan controller 120 includes a software module executing on a processor or microcontroller. For example, in one embodiment, fan controller 120 is a software module executing on microprocessor 130.

In the embodiment of FIGS. 5A and 5B, some or all of the described operations are implemented using a monolithic integrated circuit such as the TelCom TC646. In another embodiment, some or all of the above described operations are implemented using another integrated circuit. In another embodiment, some or all of the above described operations are implemented using discrete hardware such as analog comparators, operational amplifiers, and/or discrete logic devices such as gates. In another embodiment, some or all of the above described operations are implemented using software code of a microcontroller or microprocessor. In another embodiment, some or all of the above described operations are implemented using a combination of some or all of the above listed implementation elements.

In another embodiment, the sense/drive circuit 150 is implemented in a monolithic integrated circuit such as TelCom's TC643. A data sheet for the TC643 is publicly available from TelCom via TelCom's internet web site. The data sheet for the TC643 part which is available, for example, at internet uniform resource locator address http://www.telcom-semi.com/datashts/TC643.pdf on May 15, 1998 is incorporated herein by reference.

In one embodiment, system 100 includes a power supply system or other heat generating system. In one embodiment, system 100 includes an information processing system. Information processing systems include such systems as computer systems and telecommunications systems. Computer systems may be found in many forms including, for example, mainframes, workstations, servers, personal computers, notepads and embedded systems. A typical computer system includes at least one processing unit, associated memory and a number of input/output (I/O) devices. One of the distinguishing characteristics of personal computer systems is the use of a system board to electrically couple these components together. These components typically generate heat during normal operation.

Although a bipolar transistor 222 is used in twitch circuit 220, other types of transistors or switching circuits may be used in place of or in addition to transistor 222. For example, a Darlington transistor pair or a field effect transistor may be used. Furthermore, each of the transistors used in the above described embodiments (whether bipolar, field effect, etc.) may be conceptualized as having a control terminal which controls the flow of current between a first current handling terminal and a second current handling terminal. An appropriate condition on the control terminal causes a current to flow from/to the first current handling terminal and to/from the second current handling terminal. For example, whereas a control voltage may be described as being applied to a field effect transistor gate terminal in one embodiment, other embodiments may be more generally described as having a control signal applied to a transistor control terminal. In a bipolar NPN transistor, for example, the first current handling terminal is the collector, the control terminal is the base, and the second current handling terminal is the emitter. A sufficient current into the base causes a collector-to-emitter current to flow. In a bipolar PNP transistor, the first current handling terminal is the emitter, the control terminal is the base, and the second current handling terminal is the collector. A current flowing between the base and emitter causes an emitter-to-collector current to flow. Similar principles apply to other types of transistors and are well known in the art.

Regarding the signals described herein, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the above described embodiment are characterized as being transmitted from one block to the next, other embodiments of the invention may include modified signals in place of such directly tansmitted signals as long as the informational and/or functional aspect of the signal is transmitted between blocks. To some extent, due to physical limitations of the circuitry involved, a signal input at a second logic block may be conceptualized as a second signal derived from a first signal which is output from a first logic block (e.g., there will inevitably be some attenuation and delay). Therefore, as used herein, a signal transmitted between logic blocks may include a second signal derived from a first signal, whether due to circuit limitations or due to passage through other circuit elements which do not change the informational and/or final functional aspect of the first signal.

Those skilled in the art will recognize that circuit elements in circuit diagrams and boundaries between logic blocks are merely illustrative and that alternative embodiments may merge logic blocks or circuit elements or impose an alternate decomposition of functionality upon various logic blocks or circuit elements. Similarly, the operations of the above description are for illustration only. Operations may be combined or the functionality of the operations may be distributed in additional operations in accordance with the invention. In one embodiment, the operations are implemented via software modules. Other embodiments use non-software based control methods such as application specific integrated circuits.

Moreover, alternative embodiments may combine multiple instances of a particular component. For example, multiple fans 160 may be controlled by a fan controller 130. System 100 may include multiple Ian controllers 170. System 100 may include multiple power supplies 110 and may include external power supplies 110.

Although an attempt has been made to outline a few exemplary variations, other examples of the invention are within the scope of invention as defined in the claims below.

What is claimed is:

1. An apparatus for sensing the rotation of a brushless DC fan motor, the apparatus comprising:

a fan;

a sense/driver circuit coupled to the fan to receive a sense input signal, the sense input signal including a fluctuating electrical effect caused by fan commutation events, the sense/driver circuit processing the sense input signal to generate a sense output signal from the electrical effect, the sense output signal being indicative of fan operation, the sense/driver circuit including
     an integrated circuit, the integrated circuit including
       a sense input pin, the sense input pin being coupled to receive the sense input signal;
       a ground return pin, the ground return pin being coupled to a ground reference potential;
       a driver circuit, the driver circuit opening and closing a circuit to connect and disconnect power to the fan, the driver circuit including a control terminal and first and second current handling terminals, the first current handling terminal being coupled to the sense input pin, the second current handling terminal being coupled to provide a ground return path via the ground return pin;
       an integrated filter portion, the integrated filter portion including a filter input coupled to one of the first and second current handling terminals of the driver circuit, the integrated filter portion including a filter output for providing a filter output signal;
       a filter pin coupled to the integrated filter portion; and
       a level detecting circuit, the level detecting circuit having an input coupled to receive the filter output signal, the level detecting circuit generating the sense output signal from the filter output signal; and
     a capacitance, the capacitance coupled to the filter pin, the integrated filter portion and the capacitance comprising a filter, the filter deriving the filter output signal responsive to receiving a signal at the sense input pin, the filter output signal being indicative of the fan commutation events.

2. The apparatus of claim 1, wherein the driver circuit includes a driver transistor, the driver transistor including the control terminal and the first and second current handling terminals.

3. The apparatus of claim 2, the ground return path comprises:

a current sensing resistance, the current sensing resistance having a first terminal being coupled to the second current handling terminal and a second terminal being coupled to the ground return pin.

4. The apparatus of claim 1, the ground return path comprises:

a current sensing resistance on the integrated circuit, the current sensing resistance having a first terminal being coupled to the second current handling terminal and a second terminal being coupled to the ground return pin.

5. The apparatus of claim 1, wherein The level detecting circuit comprises:

an operational amplifier, the operational amplifier having an input coupled to receive the filter output signal, the operational amplifier generating the sense output signal from the filter output signal.

6. The apparatus of claim 1, wherein the level detecting circuit comprises:

a comparator, the comparator having a first input coupled to receive the filter output signal and a second input coupled to receive the sense input signal, the operational amplifier generating the sense output signal from the filter output signal and the sense input signal.

7. The apparatus of claim 1, wherein the filter input of the integrated filter portion is coupled to the first current handling terminal of the driver circuit.

8. The apparatus of claim 1, wherein the filter input of the integrated filter portion is coupled to the second current handling terminal of the driver circuit.

9. An apparatus for sensing the rotation of a brushless DC fan motor, the apparatus comprising:

a sense circuit coupled to receive a sense input signal, the sense input signal including a fluctuating electrical effect caused by fan commutation events, the sense circuit processing the sense input signal to generate a sense output signal from the electric,l effect, the sense output signal being indicative of fan operation, the sense circuit including an integrated circuit, the integrated circuit including a sense input pin, the sense input pin being coupled to receive the sense input signal;

an integrated filter portion, the integrated filter portion being coupled to the sense input pin, the integrated filter portion having a filter output for providing a filter output signal;

a filter pin coupled to the integrated filter portion; and a level detecting circuit, the level detecting circuit having an input coupled to receive the filter output signal, the level detecting circuit generating the sense output signal from the filter output signal;

wherein the filter pin of the integrated circuit is for coupling to a discrete capacitor, the integrated filter portion and the capacitance comprising a filter when the capacitor is coupled to the filter pin, the filter deriving the filter output signal responsive to receiving a signal at the sense input pin, the filter output signal being indicative of the fan commutation events.

10. The apparatus of claim 9, wherein the level detecting circuit includes a comparator, the comparator including first and second inputs, the first input being coupled to the sense input pin; and the integrated filter portion includes a resistance, the resistance including a first terminal coupled to the sense input pin and a second terminal coupled to the filter pin and the second input of the comparator.

11. The apparatus of claim 10 further comprising the discrete capacitor, the discrete capacitor having a first terminal coupled to the filter pin and a second terminal coupled to a ground reference potential.

12. The apparatus of claim 9, the apparatus further comprising:

a series circuit, the series circuit being coupled to provide the sense input signal to the sense circuit, the series circuit including a first power reference potential;

a second power reference potential;

a fan; and a driver circuit on the integrated circuit, the first and second power reference potentials, the fan, and the driver circuit being coupled in series, the fan receiving power under control of the driver circuit, the fan rotating responsive to receiving the power, the fan generating the fluctuating electrical effect due to fan commutation events when the fan is rotating.

13. The fan unit of claim 12, wherein the fluctuating electrical effect is a commutation current signal of the series circuit including fluctuations corresponding to motor pole crossings;

the integrated circuit includes a current sensing, resistor coupled in series in the series circuit;

the sense circuit is coupled to sense a voltage on the current sensing resistor due to the commutation current signal.

14. The fan unit of claim 12, wherein the fluctuating electrical effect is a commutation current signal of the series circuit including fluctuations corresponding to motor pole crossings;

the integrated filter portion and the level detecting circuit are coupled to a current handling terminal of the driver circuit to sense a commutation voltage at the current handling terminal, the commutation voltage varying due to the commutation current signal.

15. The fan unit of claim 14, wherein the integrated filter portion and the level detecting circuit are coupled to the first current handling terminal.

16. The fan unit of claim 14, wherein the integrated filter portion is coupled to the first current handling terminal via the second current handling terminal; and the level detecting circuit is coupled to the second current handling terminal.

17. The apparatus of claim 12 wherein the apparatus further includes a fan controller, the fan controller providing a fan control signal to the driver circuit; and the driver circuit includes a driver transistor, the driver transistor including first and second current handling terminals and a control terminal, the first and second power reference potentials, the fan, and the first and second current handling terminals of the driver transistor being coupled in series, the fan receiving power when the driver transistor is conducting between the first and second current handling terminals, the driver transistor conducting responsive to receiving the fan control signal having a first value at the control terminal of the driver transistor.

18. The apparatus of claim 17 wherein the fan controller is a microprocessor.

19. The apparatus of claim 17 wherein the fan control signal is a pulse modulated signal.

20. The apparatus of claim 18 wherein the fan control signal is a pulse width modulated signal.

21. The apparatus of claim 18 wherein the fan control signal is a pulse frequency modulated signal.

22. The apparatus of claim 17, wherein the driver transistor is a bipolar transistor;

the first current handling terminal is a collector;

the second current handling terminal is an emitter.

23. The apparatus of claim 12, wherein the sense circuit generates a speed indication signal indicating the speed of the fan responsive to sensing the fluctuating electrical effect in the series circuit, the speed indication signal including a pulse for each commutation of the fan; and wherein the apparatus further comprises an arithmetic module, the arithmetic module including means for determining a number of pulses of the speed indication signal during a time; and means for determining a fan speed from the number of pulses, the time and a number of poles of the fan.

24. The apparatus of claim 23, the apparatus further comprising:

an information processing system, the information processing system including a microprocessor;

a memory coupled to the microprocessor;

the series circuit;

the sense circuit; and the arithmetic module, the arithmetic module being comprised within the microprocessor.

25. The method of claim 24, the method further comprising:

coupling a discrete capacitance to the filter pin of the integrated circuit, the integrated filter portion and the discrete capacitance comprising a filter.

26. The method of claim 25, the method further comprising:

generating by the level detecting circuit a sense output signal indicative of the fan commutation events from a filter output signal received from the filter output;

monitoring the fan for commutation fluctuations for a time period with a commutation fluctuation occurring for each pole during a revolution of the fan; and generating by the filter a filter output signal responsive to the signal at the sense input pin, the filter output signal being indicative of the fan commutation events.

27. A method of verifying the operation of a brushless DC fan motor, the method comprising:

delivering a fluctuation electrical effect caused by fan motor commutation events to a sense input pin of an integrated circuit; the integrated circuit having a filter pin, an integrated filter portion including a resistance having a first terminal coupled to a filter input and a second node coupled to the filter pin an a filter output, a level detecting circuit having an input coupled to the filter output, and a driver circuit having a first and a second current handling terminal with the first current handling terminal coupled to the sense input pin and the second current handling terminal coupled to provide a ground return path and with at least one of the firs t and the second current handling terminals being coupled to the filter input.

* * * * *